(12) United States Patent
Tian et al.

(10) Patent No.: US 10,054,134 B2
(45) Date of Patent: Aug. 21, 2018

(54) FAN AND ELECTRONIC DEVICE

(71) Applicants: Beijing Lenovo Software Ltd., Beijing (CN); Lenovo (Beijing) Co., Ltd., Beijing (CN)

(72) Inventors: Ting Tian, Beijing (CN); Ziran Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 217 days.

(21) Appl. No.: 14/976,561

(22) Filed: Dec. 21, 2015

(65) Prior Publication Data

US 2017/0089361 A1  Mar. 30, 2017

(30) Foreign Application Priority Data

Sep. 29, 2015  (CN) .......................... 2015 1 0633601

(51) Int. Cl.
| | | |
|---|---|---|
| *F04D 29/70* | (2006.01) | |
| *G06F 1/20* | (2006.01) | |
| *F04D 25/06* | (2006.01) | |
| *F04D 29/42* | (2006.01) | |

(52) U.S. Cl.
CPC ....... *F04D 29/703* (2013.01); *F04D 25/0613* (2013.01); *F04D 29/4226* (2013.01); *G06F 1/20* (2013.01)

(58) Field of Classification Search
CPC .... F04D 29/4226; F04D 29/70; F04D 29/701; F04D 17/16
See application file for complete search history.

(56) References Cited

U.S. PATENT DOCUMENTS

| | | | | |
|---|---|---|---|---|
| 6,550,596 B2 * | 4/2003 | Shiozaki | ............... | F04D 27/004 192/58.61 |
| 8,206,099 B2 * | 6/2012 | Tsai | .................... | F04D 29/4246 415/206 |
| 2008/0038618 A1 * | 2/2008 | Naito | .................... | F04D 29/701 429/414 |
| 2011/0097195 A1 * | 4/2011 | Horng | .................. | F04D 27/004 415/121.2 |
| 2012/0026677 A1 * | 2/2012 | Bhutani | .............. | F04D 25/0613 361/679.48 |

FOREIGN PATENT DOCUMENTS

| | | | | |
|---|---|---|---|---|
| CN | 201687738 U | 12/2010 | | |
| CN | 102238821 A | 11/2011 | | |
| CN | 102374179 A | 3/2012 | | |
| CN | 102418705 A | * 4/2012 | | |
| CN | 202348782 U | 7/2012 | | |
| FR | 2757576 A1 | * 6/1998 | ......... | F04D 29/4226 |
| GB | 1029794 A | * 5/1966 | ............. | F24F 13/00 |

OTHER PUBLICATIONS

First Chinese Office Action regarding Application No. 201510633601.0 dated Sep. 1, 2017. English translation provided by http://globaldossier.uspto.gov.

\* cited by examiner

*Primary Examiner* — Justin Seabe
(74) *Attorney, Agent, or Firm* — Harness, Dickey & Pierce, P.L.C.

(57) ABSTRACT

A fan and an electronic device are provided. An opening is provided on a sidewall of a housing of the fan, a baffle is arranged at the opening and to cover a part of the opening. When an impeller of the fan rotates in a first direction, a first end of the baffle is fixed and a second end of the baffle moves towards the inside of the housing, or in the case that the impeller rotates in the first direction, the baffle protrudes towards the inside of the housing to form a protrusion. In the case that the impeller rotates in a second direction, the second end of the baffle moves towards the outside of the housing, or in the case that the impeller rotates in the second direction, the baffle protrudes towards the outside of the housing to form a protrusion.

18 Claims, 5 Drawing Sheets

FAN AND ELECTRONIC DEVICE

CROSS-REFERENCE TO RELATED APPLICATIONS

This application claims the benefit of priority to Chinese Patent Application No. 201510633601.0 titled "FAN AND ELECTRONIC DEVICE", filed with the Chinese State Intellectual Property Office on Sep. 29, 2015, the entire disclosure of which is incorporated herein by reference.

TECHNICAL FIELD

The present application relates to the technology field of electronic devices, and in particular to a fan and an electronic device.

BACKGROUND

With the rapid development of the electronic technology, more and more electronic elements, including a lot of heat generating elements, are integrated into an electronic device (such as a desktop computer, a laptop computer or the like). Therefore, to avoid damage to the electronic device caused by overheating, a cooling fan is arranged inside the electronic device and a vent for dissipating heat is provided on a housing of the electronic device, so as to cool the electronic device.

However, dust may more or less exist in the operating environment of the electronic device, and dust may enter into the electronic device through a heat dissipating port, and over a period of time, dust may accumulate on the fan and components adjacent to the fan, which may cause harmful effect on the electronic device. Thus, it is required to remove dust from the electronic device regularly.

At present, when it is required to remove dust from an electronic device, a user has to deliver the electronic device to a professional, and the professional may disassemble the electronic device and manually remove dust from the electronic device, which leads to a high cost for removing dust. Therefore, an urgent technical issue to be addressed by the person skilled in the art is to reduce the cost for removing dust from an electronic device.

SUMMARY

A fan and an electronic device are provided according to the present application, to reduce the cost for removing dust from the electronic device.

A fan includes a housing including a sidewall on which an opening is provided; an impeller arranged in the housing; and a baffle movably connected to the housing and being configured to cover a part of the opening; wherein in the case that the impeller rotates in a first direction, the baffle is configured to move towards an inside of the housing; and in the case that the impeller rotates in a second direction, the baffle is configured to move towards an outside of the housing.

An electronic device includes the fan, wherein the opening is located at a side of the electronic device where a vent is located.

BRIEF DESCRIPTION OF THE DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

Figure 1:
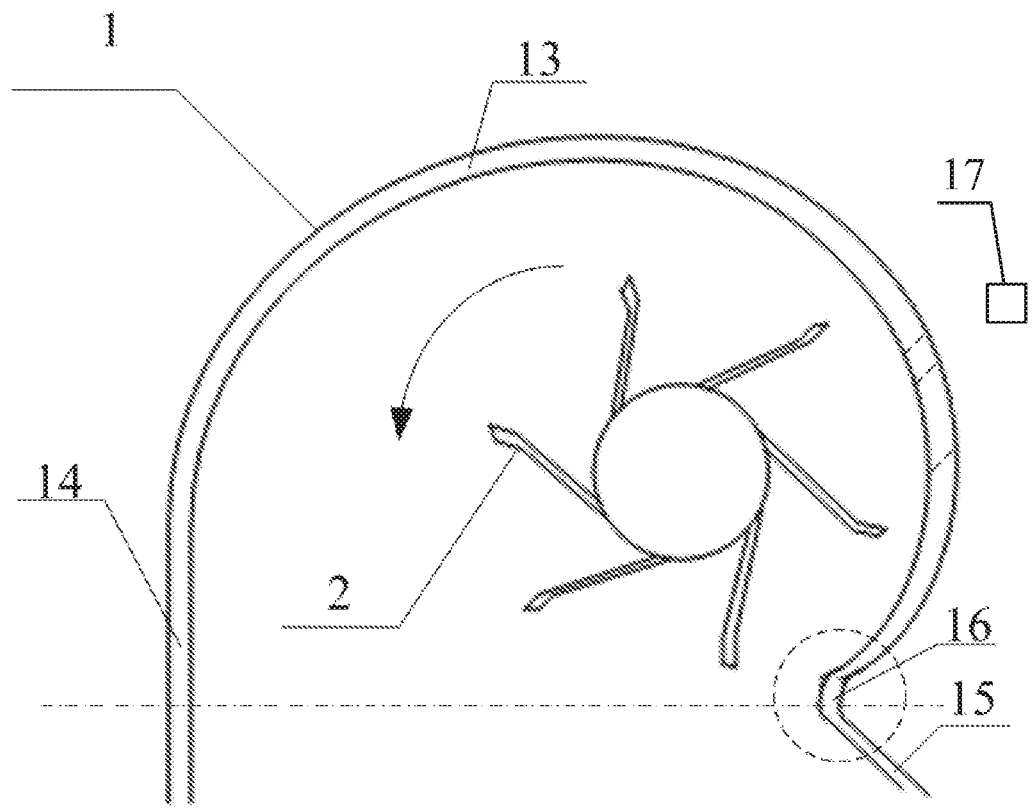
FIG. 1 is a front view of a fan according to an embodiment of the present application.

The terms "first", "second", "third", "fourth" and the like (if present) in the description, claims and drawings are used for distinguishing between similar parts and are not intended to describe a specific sequence or precedence order. It is to be understood that the numbers used here are interchangeable under appropriate circumstances, thus the embodiments of the present application described herein can be implemented in other sequence than that shown in the drawings.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 2:
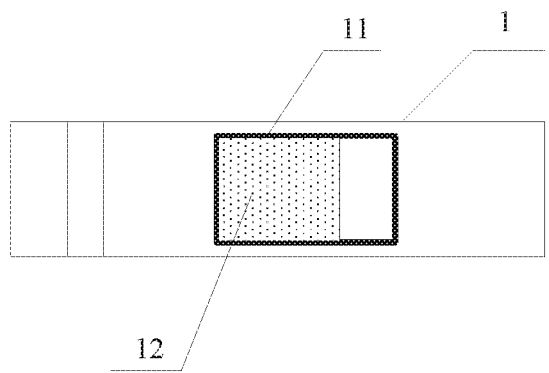
FIG. 2 is a right view of the fan in FIG. 1 according to the embodiment of the present application.

Reference is made to FIGS. 1 and 2, FIG. 1 is a front view of a fan according to an embodiment of the present application, and FIG. 2 is a right view of the fan in FIG. 1. A fan according to the present application may include a housing 1 and an impeller 2. The impeller 2 is arranged in the housing 1. An opening 11 (as indicated by a thick lined square frame "□" in FIG. 2) is provided on a sidewall of the housing 1, a baffle 12 (as indicated by a shaded area "▧" in FIG. 2) is arranged at the opening 11, and only a part of the opening 11 is covered by the baffle 12, that is, the area of the baffle 12 is smaller than the area of the opening 11.

When the impeller 2 rotates in a first direction, one end of the baffle 12 (referred to as a first end for ease of description) is fixed, and another end of the baffle 12 (referred to as a second end for ease of description) is able to move towards the inside of the housing 1, or when the impeller 2 rotates in the first direction, the baffle 12 protrudes towards the inside of the housing 1 to form a protrusion, to guide air at the opening 11 inside the housing, thereby reducing the resistance to introducing air at the side of the housing 1, and preventing the performance degradation of the fan caused by the opening of the sidewall of the housing 1.

When the impeller 2 rotates in a second direction, the first end of the baffle 12 is fixed, and the second end of the baffle 12 is able to move towards the outside of the housing 1, or when the impeller 2 rotates in the second direction, the baffle 12 protrudes towards the outside of the housing 1 to form a protrusion, to make the air pressure inside the housing 1 to drop abruptly at the opening 11, to reduce the flow rate of the air inside the housing 1, thereby blowing dust out of the opening 11 and assisting in collecting dust, and preventing the dust inside the housing 1 from adhering to other components (such as a radiator) in the electronic device. In other words, with the fan provided by the embodiment of the present application, when the impeller rotates in the second direction, even if dust exits in the housing 1, since the air pressure at the opening 11 abruptly drops and the flow rate of the air is reduced, the dust in the housing 1 may settle at the opening 11 rather than adhering to other components adjacent to the impeller 2. Moreover, the dust settled at the opening 11 may be removed out of the housing 1 from the inside of the housing 1 as the impeller 2 rotates in the second direction.

If the first direction is the direction indicated by an arrow in FIG. 1, the second direction is a direction opposite to the first direction. When the impeller 2 rotates in the first direction, the fan is in a heat dissipation mode; and when the impeller 2 rotates in the second direction, the fan is in a dust removing mode.

In the embodiment of the present application, when the impeller 2 rotates, the second end of the baffle 12 deflects by pivoting around the first end; or, when the impeller 2 rotates, the baffle 12 is deformed, to protrude towards the inside or outside of the housing 1 to form a protrusion. The state variation (defecting or deforming) of the baffle 12 changes according to the material of the baffle 12 and the arrangement manner of the baffle 12 on the sidewall of the housing 1.

Whether the baffle 12 deflects or deforms, an air passage in the housing 1 may be changed, thus when the impeller 2 rotates in the first direction, the performance of the fan is improved; and when the impeller 2 rotates in the second direction, the fan has a function of removing dust.

In the fan according to the embodiment of the present application, an opening is provided on the sidewall of the housing of the fan, a baffle is arranged at the opening, and a part of the opening is covered by the baffle. When the impeller of the fan rotates in the first direction, one end of the baffle is fixed and the other end of the baffle is able to move towards the inside of the housing, or when the impeller rotates in the first direction, the baffle protrudes towards the inside of the housing to form a protrusion, thereby enhancing the effect of introducing air into the housing; and when the impeller rotates in the second direction, the other end of the baffle is able to move towards the outside of the housing, or when the impeller rotates in the second direction, the baffle protrudes towards the outside of the housing to form a protrusion, thereby blowing dust out of the housing via the opening and also reducing the pressure at the baffle in the housing and assisting in collecting dust.

While the strength of introducing air into the housing is maintained, dust in the fan and dust on the components adjacent to the fan can be removed, thus the amount of dust accumulated in the fan is reduced, and the time interval between operations for disassembling the electronic device to remove dust is prolonged (that is, the frequency of operations for disassembling the electronic device to remove dust is reduced), thus the cost for removing dust from the electronic device is reduced. That is, the embodiment of the present application reduces the cost for removing dust from the electronic device on the premise of ensuring the performance of the fan.

Optionally, the structure of the housing 1 is shown in FIG. 1, and the housing 1 may include an arc-shaped first sidewall 13, a flat plate-shaped second sidewall 14, and a third sidewall 15.

The flat plate-shaped second sidewall 14 is connected to a first end of the arc-shaped first sidewall 13, and the third sidewall 15 is connected to a second end of the arc-shaped first sidewall 13 through an arc surface 16 to form a volute tongue (see the area indicated by a dashed frame "◌" in FIG. 1), and the arc surface faces the flat plate-shaped second sidewall 14.

In the embodiment of the present application, the opening 11 may be provided at any positions on a part of the sidewall of the housing 1 above the volute tongue (including the entire first sidewall 13 and a part of the second sidewall 14), that is the part above the dashed line in FIG. 1.

Optionally, the baffle 12 may be a flexible film, such as a rubber film, a silicon film and the like. Three edges of the baffle 12 are respectively fixed on three sidewalls of the opening 11.

Figure 3:
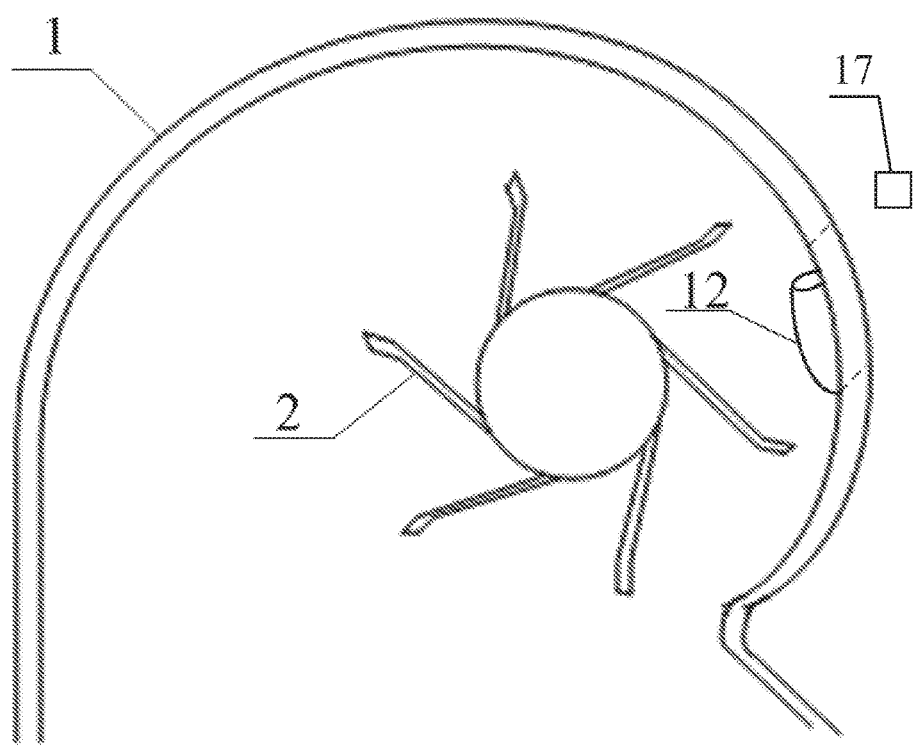
FIG. 3 is a schematic view showing a state of a baffle when an impeller rotates in a first direction according to the embodiment of the present application.
Figure 4:
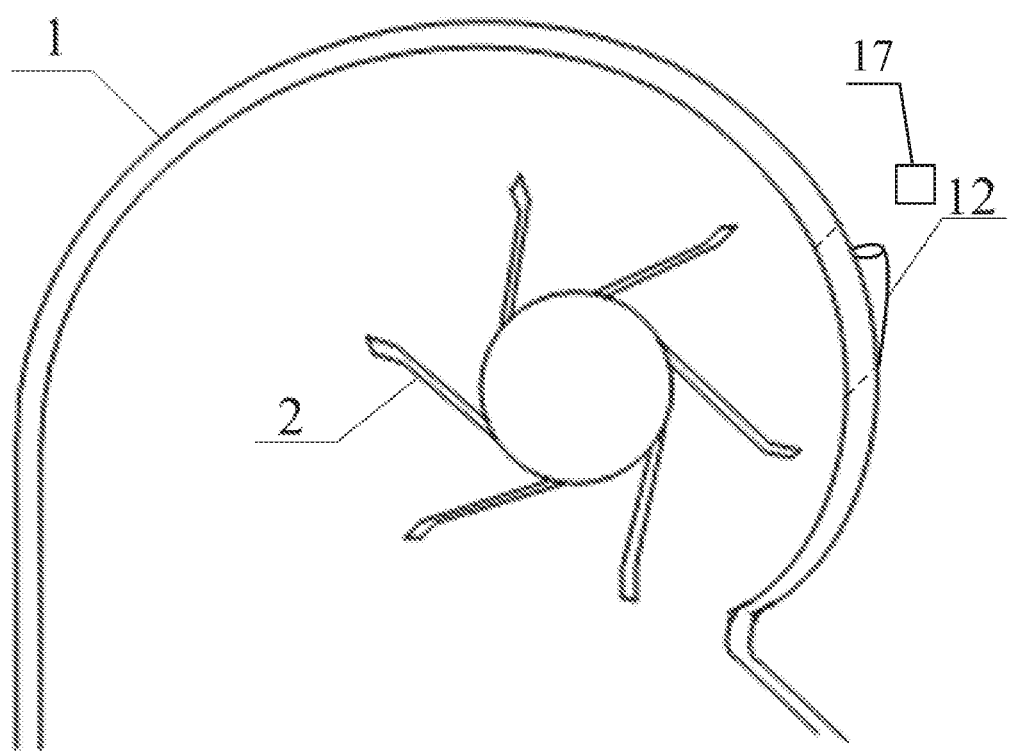
FIG. 4 is a schematic view showing a state of the baffle when the impeller rotates in a second direction according to the embodiment of the present application.

In the embodiment of the present application, when the impeller 2 rotates in the first direction, the baffle 12 deforms and protrudes towards the inside of the housing 1 to form a protrusion, and reference is made to FIG. 3, which is a schematic view showing the state of the baffle 12 when the impeller 2 rotates in the first direction according to the embodiment of the present application; and when the impeller 2 rotates in the second direction, the baffle 12 also deforms and protrudes towards the outside of the housing 1 to form a protrusion, and reference is made to FIG. 4, which is a schematic view showing the state of the baffle 12 when the impeller 2 rotates in the second direction according to the embodiment of the present application.

Optionally, the baffle 12 may be a rigid baffle, such as a rigid plastic baffle, a metal baffle and the like. The outline of the baffle 12 matches with the outline of the sidewall of the housing 1. For example, if the portion of the sidewall of the housing 1 where the opening 11 is provided has an arc shape, the baffle 12 also has an arc shape, and the radian of the baffle 12 is equal to the radian of the portion of the sidewall of the housing 1 where the opening 11 is provided; and if the portion of the sidewall of the housing 1 where the opening 11 is provided is in a shape of a straight plate, the baffle 12 is also in a shape of a straight plate.

Figure 7:
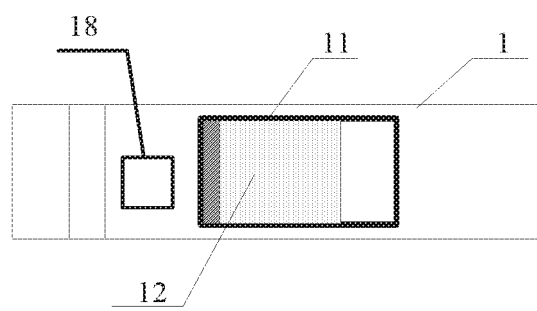
FIG. 7 is a schematic view showing a connection relationship between the baffle and the housing according to the embodiment of the present application.

In this embodiment, only one edge of the baffle 12 is fixed at the sidewall of the opening 11. The baffle 12 is fixed at a sidewall of the opening 11 through a swingable component. Reference is made to FIG. 7, which is a schematic view showing the connection relationship between the baffle 12 and the housing 1 according to the embodiment of the present application. In FIG. 7, the swingable component is indicated by a shaded area "▧". The swingable component is connected to the first end of the baffle 12, to allow the second end of the baffle 12 to swing around the first end.

Figure 5:
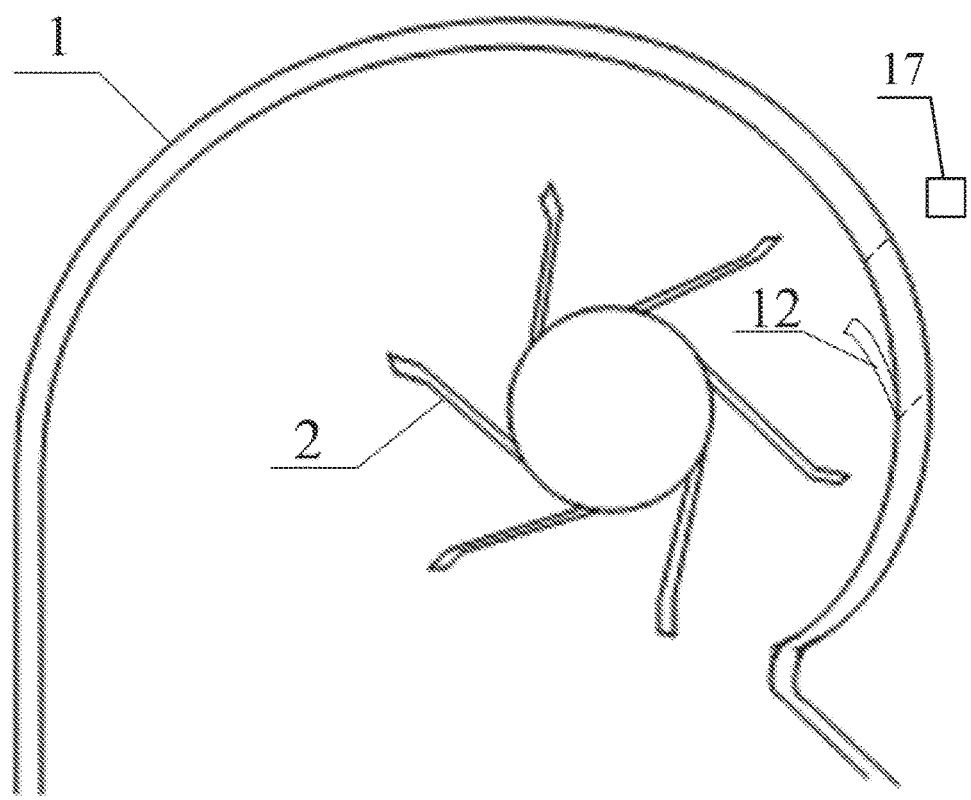
FIG. 5 is a schematic view showing another state of the baffle when the impeller rotates in the first direction according to the embodiment of the present application.
Figure 6:
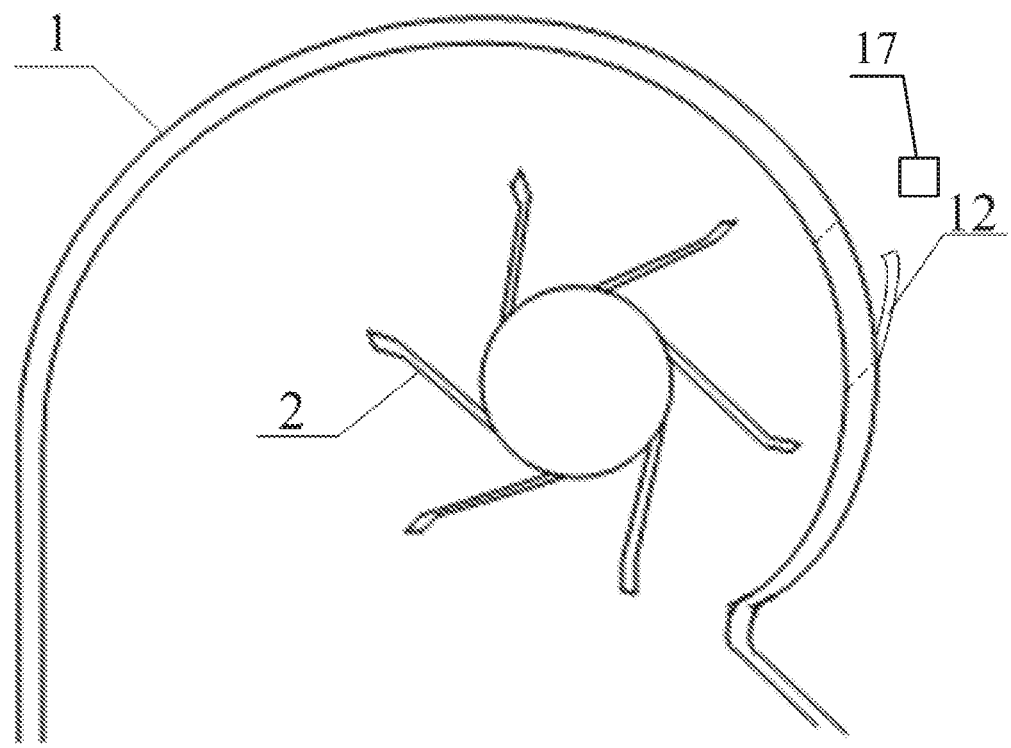
FIG. 6 is a schematic view showing another state of the baffle when the impeller rotates in the second direction according to the embodiment of the present application.

When the impeller 2 rotates in the first direction, the first end of the baffle 12 is fixed and the second end of the baffle 12 moves towards the inside of the housing 1, and reference is made to FIG. 5, which is a schematic view showing another state of the baffle 12 when the impeller 2 rotates in the first direction according to the embodiment of the present application. When the impeller 2 rotates in the second direction, the first end of the baffle 12 is fixed, and the second end of the baffle 12 move towards the outside of the housing 1, and reference is made to FIG. 6, which is a schematic view showing another state of the baffle 12 when the impeller 2 rotates in the second direction according to the embodiment of the present application.

Optionally, the swingable component may be a flexible component. That is, the first end of the baffle 12 is fixed at a sidewall of the opening 11 through the flexible component. Since only the first end of the baffle 12 is connected to the flexible component and other ends of the baffle 12 are not connected to the housing 1 or other components, the baffle 12 will move under the atmospheric pressure when the impeller 2 rotates, and since the swingable component is a flexible component, the second end of the baffle 12 can move towards the inside or outside of the housing 1.

Further, when the impeller 2 stops rotating and the air pressure inside the housing 1 is equal to the air pressure outside the housing 1, the flexible component may return to an original state, which allows the baffle 12 to return to an original state, that is, the baffle 12 being located in the opening 11 or the baffle 12 fitting closely with the housing 1.

Optionally, the swingable component may be a rotating shaft. That is, the first end of the baffle 12 is fixed at a sidewall of the opening 11 via the rotating shaft. Since only the first end of the baffle 12 is connected to the rotating shaft and other ends of the baffle 12 are not connected to the housing 1 or other components, the baffle 12 moves under the atmospheric pressure when the impeller 2 rotates. Since the swingable component is a rotating shaft, the second end of the baffle 12 can move towards the inside or outside of the housing 1.

Further, when the impeller 2 stops rotating, the rotating shaft may allow the baffle 12 to return to an original state, for example, the baffle 12 being located in the opening 11.

Optionally, the swingable component may be a controllable rotating component. That is, the first end of the baffle 12 is fixed at a sidewall of the opening 11 through the controllable rotating component. The fan according to the embodiment of the present application further includes a controller 18 configured to control a rotating direction of the controllable rotating component, and the controller 18 is in signal communication with the controllable rotating component. When the impeller 2 rotates in the first direction, the controller 18 controls the controllable rotating component to rotate in the first direction, to make the second end of the baffle 12 to move towards the inside of the housing 1; and when the impeller 2 rotates in the second direction, the controller 18 controls the controllable rotating component to rotate in the second direction, to make the second end of the baffle 12 to move towards the outside of the housing 1.

Further, when the impeller 2 stops rotating, the controller 18 may control the controllable rotating component to return to an original state, to allow the baffle 12 to return to an original state, for example, the baffle 12 being located in the opening 11.

Optionally, the baffle 12 may be a magnetic baffle. The fan according to the embodiment of the present application may include a magnetic pole 17 arranged at an outer side of the housing 11 and adjacent to the baffle 12 and configured to generate a magnetism same as or opposite to the magnetism of the baffle 12. When the magnetism generated by the magnetic pole 17 is same as the magnetism of the baffle 12, the second end of the baffle 12 moves towards the inside of the housing 1. When the magnetism generated by the magnetic pole 17 is opposite to the magnetism of the baffle 12, the second end of the baffle 12 moves towards the outside of the housing 1.

In this embodiment of the present application, the baffle 12 may be fixed at a sidewall of the opening 11 through a flexible component or a rotating shaft.

When the impeller 2 rotates in the first direction, the magnetic pole 17 is controlled to generate a magnetism same as the magnetism of the baffle 12, to make the second end of the baffle 12 move towards the inside of the housing 1. When the impeller 2 rotates in the second direction, the magnetic pole 17 is controlled to generate a magnetism opposite to the magnetism of the baffle 12, to make the second end of the baffle 12 move towards the outside of the housing 1.

An electronic device is further provided according to an embodiment of the present application, the electronic device has the fan according to any of the above embodiments, and the opening on the housing of the fan is located at a side of the electronic device where a vent is located.

The fan and the electronic device provided by the present application are described in detail hereinbefore. The principle and the embodiments of the present application are illustrated herein by specific examples. The above description of examples is only intended to help the understanding of the method and the spirit of the present application. It should be noted that, for the person skilled in the art, a few of modifications may be made to the embodiments and the application scope based on the concept of the present application. In conclusion, the content of the specification is not intended to limit the scope of the present application.

The above embodiments are described in a progressive manner. Each of the embodiments is mainly focused on describing its differences from other embodiments, and references may be made among these embodiments with respect to the same or similar portions among these embodiments.

It should be noted that, in the specification, the description of relationship, such as "greater than" or "exceeding" or "higher than" or the like, can be understood as "greater than and not equal to" and also can be understood as "greater than or equal to", without necessarily requiring or implying a defined or inherent situation.

Furthermore, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

It should be noted that the embodiments described hereinabove are only a part of the preferred embodiments of the present application and are used to help those skilled in the art to fully understand or implement the present application, rather than all embodiments. The general principle defined herein may be implemented in other embodiments without departing from the spirit or scope of the present application. Therefore, based on the above embodiments, many obvious improvements and modifications may be made to the present application by those skilled in the art without any creative efforts, without departing from the principle of the present application, and all of other embodiments obtained by those improvements and modifications can be applied in the technical solutions of the present application, without affecting the implementation of the present application, and should fall into the scope of the present application. Hence, the present application is not limited to these embodiments disclosed herein, but should be defined by the broadest scope consistent with the principle and novel features disclosed herein.

What is claimed is:

1. A fan comprising:
   a housing comprising a sidewall on which an opening is provided;
   an impeller arranged in the housing; and
   a baffle movably connected to the housing and being configured to cover a part of the opening, and an area of the baffle being smaller than an area of the opening;
   wherein in the case that the impeller rotates in a first direction, the baffle is configured to move towards an inside of the housing; and
   in the case that the impeller rotates in a second direction, the baffle is configured to move towards an outside of the housing.

2. The fan according to claim 1, wherein in the case that the impeller rotates in the first direction, a first end of the baffle is fixed and a second end of the baffle is configured to move towards the inside of the housing; or, in the case that the impeller rotates in the first direction, the baffle is configured to protrude towards the inside of the housing to form a protrusion; and
   in the case that the impeller rotates in the second direction, the second end of the baffle is configured to move towards the outside of the housing; or in the case that the impeller rotates in the second direction, the baffle is configured to protrude towards the outside of the housing to form a protrusion.

3. The fan according to claim 1, wherein the sidewall of the housing comprises an arc-shaped first sidewall, a flat plate-shaped second sidewall and a third sidewall; wherein,
   the flat plate-shaped second sidewall is connected to a first end of the arc-shaped first sidewall, and the third sidewall is connected to a second end of the arc-shaped first sidewall through an arc surface to form a volute tongue, and the arc surface faces the flat plate-shaped second sidewall; and
   the opening is provided on the arc-shaped first sidewall.

4. The fan according to claim 1, wherein the baffle is a flexible film, and three edges of the baffle are respectively fixed on three sidewalls of the opening.

5. The fan according to claim 2, wherein the baffle is a rigid baffle, an outline of the baffle matches with an outline of the sidewall of the housing, and the first end of the baffle is fixed at a sidewall of the opening through a swingable component.

6. The fan according to claim 5, wherein the first end of the baffle is fixed at the sidewall of the opening through a flexible component.

7. The fan according to claim 5, wherein the first end of the baffle is fixed at the sidewall of the opening through a rotating shaft.

8. The fan according to claim 5, wherein the baffle is fixed at the sidewall of the opening through a controllable rotating component; and
   the fan further comprises a controller configured to control a rotating direction of the controllable rotating component, and the controller is in signal communication with the controllable rotating component.

9. The fan according to claim 5, wherein the baffle is a magnetic baffle, and the fan further comprises:
   a magnetic pole arranged at an outer side of the housing and adjacent to the baffle and configured to generate a magnetism same as or opposite to a magnetism of the baffle;
   in the case that the magnetism generated by the magnetic pole is same as the magnetism of the baffle, the second end of the baffle is configured to move towards the inside of the housing; and
   in the case that the magnetism generated by the magnetic pole is opposite to the magnetism of the baffle, the second end of the baffle is configured to move towards the outside of the housing.

10. An electronic device, comprising a fan, wherein the fan comprises:
    a housing comprising a sidewall on which an opening is provided;
    an impeller arranged in the housing; and
    a baffle movably connected to the housing and being configured to cover a part of the opening, and an area of the baffle being smaller than an area of the opening;
    wherein in the case that the impeller rotates in a first direction, the baffle is configured to move towards an inside of the housing; and
    in the case that the impeller rotates in a second direction, the baffle is configured to move towards an outside of the housing; and
    the opening is located at a side of the electronic device where a vent is located.

11. The electronic device according to claim 10, wherein in the case that the impeller rotates in the first direction, a first end of the baffle is fixed and a second end of the baffle is configured to move towards the inside of the housing; or, in the case that the impeller rotates in the first direction, the baffle is configured to protrude towards the inside of the housing to form a protrusion; and
    in the case that the impeller rotates in the second direction, the second end of the baffle is configured to move towards the outside of the housing; or in the case that the impeller rotates in the second direction, the baffle is configured to protrude towards the outside of the housing to form a protrusion.

12. The electronic device according to claim 10, wherein the sidewall of the housing comprises an arc-shaped first sidewall, a flat plate-shaped second sidewall and a third sidewall; wherein,
    the flat plate-shaped second sidewall is connected to a first end of the arc-shaped first sidewall, and the third sidewall is connected to a second end of the arc-shaped first sidewall through an arc surface to form a volute tongue, and the arc surface faces the flat plate-shaped second sidewall; and
    the opening is provided on the arc-shaped first sidewall.

13. The electronic device according to claim 10, wherein the baffle is a flexible film, and three edges of the baffle are respectively fixed on three sidewalls of the opening.

14. The electronic device according to claim 11, wherein the baffle is a rigid baffle, an outline of the baffle matches with an outline of the sidewall of the housing, and the first end of the baffle is fixed at a sidewall of the opening through a swingable component.

15. The electronic device according to claim 14, wherein the first end of the baffle is fixed at the sidewall of the opening through a flexible component.

16. The electronic device according to claim 14, wherein the first end of the baffle is fixed at the sidewall of the opening through a rotating shaft.

17. The electronic device according to claim 14, wherein the baffle is fixed at the sidewall of the opening through a controllable rotating component; and the fan further comprises a controller configured to control a rotating direction of the controllable rotating component, and the controller is in signal communication with the controllable rotating component.

18. The electronic device according to claim 14, wherein the baffle is a magnetic baffle, and the fan further comprises:

a magnetic pole arranged at an outer side of the housing and adjacent to the baffle and configured to generate a magnetism same as or opposite to a magnetism of the baffle;

in the case that the magnetism generated by the magnetic pole is same as the magnetism of the baffle, the second end of the baffle is configured to move towards the inside of the housing; and in the case that the magnetism generated by the magnetic pole is opposite to the magnetism of the baffle, the second end of the baffle is configured to move towards the outside of the housing.

\* \* \* \* \*